United States Patent Office 3,651,081
Patented Mar. 21, 1972

3,651,081
PRODUCTION OF 2-ARYL-3-AMINOINDAZOLES
Hans-Juergen Sturm, Ludwigshafen (Rhine), and Herbert Armbrust, Gruenstadt, Germany, assignors to Badische Anilin- & Soda-Fabrik Aktiengesellschaft, Ludwigshafen (Rhine), Germany
No Drawing. Filed July 29, 1968, Ser. No. 748,210
Claims priority, application Germany, Aug. 2, 1967, P 16 70 255.9
Int. Cl. C07d 49/02
U.S. Cl. 260—310 C                                6 Claims

ABSTRACT OF THE DISCLOSURE

A process for the production of 2-substituted indazoles from ortho-azobenzonitriles by reaction with dithionites.

We have found that indazole derivatives having the general Formula I:

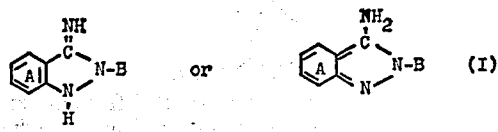

in which B denotes the radical of an unsubstituted or substituted aromatic or heterocyclic coupling component and the ring A may bear substituents are obtained when a compound having the general Formula II:

is allowed to react with a dithionite in the alkaline range at a temperature of from about 10° to 120° C.

Examples of substituents of the ring A and coupling component B are halogen atoms and alky or alkoxy or alkoxy groups and of the ring A also alkylsulfonyl or carbalkoxy groups. Specific examples are: chlorine, bromine, methyl, ethyl, methoxy, ethoxy, methylsulfonyl, carboethoxy or carbomethoxy. Substituents which (like nitro groups) are reduced under the reaction conditions should not be present in the molecule.

The radicals B of the aromatic coupling components are preferably from the benzene series, phenols, N-substituted anilines and diphenylamines being particularly suitable. Derivatives of indole are preferred heterocyclic coupling components. The following compounds are specific examples of coupling components:

phenol,
o-cresol,
m-cresol,
p-cresol,
N-ethylaminobenzene,
N-β-cyanoethylaminobenzene,
N-β-methoxyethylamino-3-methylbenzene,
N-β-cyanoethylamino-3-chlorobenzene,
N,N-dimethylaminobenzene,
N,N-diethylaminobenzene,
N,N,β-dihydroxyethylaminobenzene,
N-ethyl-N-β-hydroxyethylaminobenzene,
N-β-hydroxyethyl-N-β-cyanoethylaminobenzene,
N-β-carbomethoxyethyl-N-β-hydroxyethylaminobenzene,
N-β-hydroxyethyl-N-β-cyanoethyl-3-acetylaminoaminobenzene,
2-phenylindole, 2-methylindole, 1-methyl-2-phenylindole and 1,2-dimethylindole.

Compounds having the Formula II are obtained by coupling diazo compounds of o-aminobenzonitriles with the coupling components H—B.

Examples of suitable o-aminobenzonitriles are: 2-amino-4-methoxybenzonitrile, 2-amino-5-chlorobenzonitrile, 2-aminobenzonitrile, 2-amino-4-methylsulfonylbenzonitrile and 2-amino-4-carbomethoxybenzonitrile.

The new process is particularly suitable for the production of compounds having the general formula:

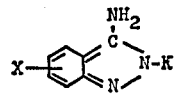

in which X denotes a hydrogen, chlorine or bromine atom or a methoxy, ethoxy, methyl, ethyl, carbomethoxy or carboethoxy group, and K denotes the radical of a phenol connected in para-position or of an N,N-disubstituted aniline or of an indole connected in the 3-position.

Particularly suitable substituents for the nitrogen atom of the aniline radical are alkyl groups having one to four carbon atoms and hydroxyethyl, cyanoethyl or hydroxypropyl groups.

Indazole derivatives having the Formula I may be prepared by reacting compounds having the Formula II with a dithionite in an alkaline medium.

Alkali metal or alkaline earth metal compounds and among these sodium dithionite are particularly suitable as dithionites. It is advantageous to use 1 to 6 moles, preferably 2 to 3 moles, of dithionite to each mole of azo compound having the Formula II. Examples of media which have proved to be suitable for the reaction are water or solvents such as alcohols, for example methanol or ethanol, glycols, glycol ethers such as glycol monomethyl ether, dioxane, acetone, acid amides such as formamide or dimethylformamide, or mixtures of these solvents.

A suitable temperature range for the reaction is from 10° to 120° C.; it is preferable to use temperatures of from 30° to 100° C.

The process may advantageously be carried out by dissolving or suspending the azo compound having the Formula II in the solvent or diluent and then adding the dithionite. The reduction reaction is usually over very quickly and completely, detectable by the disappearing of the color caused by the azo compound II. The reaction product is precipitated, if necessary after the reaction mixture has been weakly acidified, and may be isolated for example by suction filtration.

The compounds having the Formula I are obtained in excellent yields. They are valuable intermediates for the production of dyes, particularly for dyeing acrylonitrile polymer fibers.

The invention is illustrated by the following examples. Unless otherwise stated, parts and percentages referred to in the following examples are by weight.

EXAMPLE 1

7 parts of sodium dithionite is added to a solution of 4.5 parts of 2-cyano-4'-hydroxyazobenzene in 100 parts by volume of 2 N caustic soda solution and the whole is stirred for thirty minutes at 70° to 80° C. and allowed to cool. Dilute hydrochloric acid is added until there is a weakly acid reaction, the deposited precipitate is suction filtered, washed with water until neutral and dried.

4.25 parts (93.5% of the theory) of 2-p-hydroxyphenyl-3-amino-indazole is obtained having a melting point of 245° to 249° C.

EXAMPLE 2

100 parts by volume of 2 N caustic soda solution is added at 60° to 70° C. to a solution of 5 parts of 2-cyano-4'-dimethylaminoazobenzene in 40 parts by volume of glycol monomethyl ether and then 7 parts of sodium dithionite is added at 90° C. The reaction mixture is stirred for one hour at 90° to 100° C., then cooled to 40° C. and the reaction product is isolated by suction filtration, washed until neutral and dried. 4.8 parts of 2-(p-dimethylaminophenyl)-3-aminoindazole is obtained having a melting point of 181° to 183° C. The yield is 96% of theory.

EXAMPLE 3

7 parts of sodium dithionite is added at 80° to 90° C. to a solution of 5.15 parts of 2-cyano-4-chloro-4'-hydroxyazobenzene in 100 parts by volume of 2 N caustic soda solution and the whole is stirred for thirty minutes on a boiling waterbath. After the whole has cooled, it is made weakly acid with dilute hydrochloric acid and the deposited precipitate is suction filtered, washed with water and dried. 4.8 parts of 2-(p-hydroxypehnyl)-3-amino-5-chloroindazole is obtained having a melting point of 245° to 249° C. The yield is 93.5% of the theory.

EXAMPLE 4

5.2 parts of the azo dye having the formula:

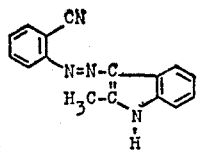

10 parts by volume of glycol monomethyl ether, 100 parts by volume of 2 N caustic soda solution and 10.2 parts of sodium dithionite are stirred for three hours at 90° to 95° C. and then allowed to cool. The deposited precipitate is suction filtered, washed with water and dried. 4.5 parts of 2-(2'-methylindolyl)-3-aminoindazole is obtained having a melting point of 282° C. The yield is 86.5% of the theory.

EXAMPLE 5

5.06 parts of 2-cyano-5-methoxy-4'-hydroxyazobenzene, 100 parts by volume of 2 N caustic soda solution and 7 parts of sodium dithionite are stirred for one hour at 95° C. and then allowed to cool. The whole is weakly acidified with dilute hydrochloric acid and the deposited precipitate is suction filtered, washed with water and dried. The yield is 4.6 parts of 2-p-hydroxypenyl-3-amino-6-methoxyindole (i.e. 91% of the theory). The compound melts at from 236° to 239° C.

EXAMPLE 6

6.06 parts of 2-cyano-(4'-N-ethyl-N-β-cyanoethylamino)-azobenzene, 10 parts by volume of ethanol, 100 parts by volume of 2 N caustic soda solution and 7 parts of sodium dithionite are stirred for thirty minutes at 90° to 95° C. and then allowed to cool. The precipitate is suction filtered, washed with water and dried. The yield is 5.5 parts (90.5% of the theory) of 2-(p-N-ethyl-N-β-cyanoethylaminophenyl)-3-aminoindazole having a melting point of 145° to 147° C.

We claim:
1. A process for the production of indazole derivatives having the formula

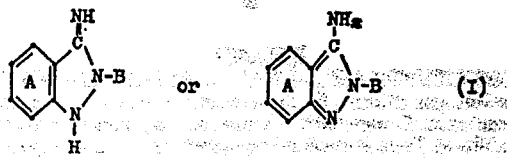

in which B denotes the radical of an unsubstituted or substituted aromatic or heterocyclic coupling component and the ring A may bear substituents, which process comprises reacting a compound having the formula

in which B and the ring have the above meanings, with a dithionite in the alkaline pH range at a temperature of from about 10° to 120° C.

2. A process as claimed in claim 1 wherein the compound reacted with said dithionate has the formula

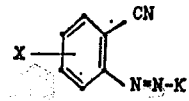

in which X denotes a substituent selected from the group consisting of hydrogen, chlorine, bromine, methoxy, ethoxy, methyl, ethyl, carbomethoxy and carboethoxy and K denotes a coupling component selected from the group consisting of a phenol attached in the para-position, a N,N-disubstituted aniline and an indole attached in the 3-position.

3. A process as claimed in claim 1 which is carried out at a temperature of from 30° to 100° C.

4. A process as claimed in claim 1 wherein said dithionite is a compound selected from the class consisting of alkali metal and alkaline earth metal dithionites.

5. A process as claimed in claim 1 wherein said dithionite is sodium dithionite.

6. A process as claimed in claim 1 wherein there are employed from 1 to 6 moles of dithionite to each mole of said compound of the Formula II.

References Cited

UNITED STATES PATENTS 3,133,081    5/1964    Lafferty et al. _____ 260—310

OTHER REFERENCES

Parnell: J. Chem. Soc., 1959, 2363–5.

Wasmuth et al.: J. Soc., Dyers Colourists 81(9), 403–5 (1965).

HENRY R. JILES, Primary Examiner

G. T. TODD, Assistant Examiner

U.S. Cl. X.R.

260—465 E